United States Patent
Kroon et al.

(10) Patent No.: US 10,061,134 B2
(45) Date of Patent: Aug. 28, 2018

(54) MULTI-VIEW DISPLAY DEVICE

(71) Applicant: KONINKLIJKE PHILIPS N.V., Eindhoven (NL)

(72) Inventors: Bart Kroon, Eindhoven (NL); Olexandr Valentynovych Vdovin, Eindhoven (NL); Mark Thomas Johnson, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 68 days.

(21) Appl. No.: 14/915,374

(22) PCT Filed: Aug. 25, 2014

(86) PCT No.: PCT/EP2014/067952
§ 371 (c)(1),
(2) Date: Feb. 29, 2016

(87) PCT Pub. No.: WO2015/032636
PCT Pub. Date: Mar. 12, 2015

(65) Prior Publication Data
US 2016/0223825 A1 Aug. 4, 2016

(30) Foreign Application Priority Data

Sep. 3, 2013 (EP) .................................. 13182714

(51) Int. Cl.
G02B 27/22 (2006.01)
H04N 13/04 (2006.01)
H04N 13/00 (2018.01)

(52) U.S. Cl.
CPC ..... *G02B 27/2214* (2013.01); *H04N 13/0037* (2013.01); *H04N 13/0404* (2013.01);
(Continued)

(58) Field of Classification Search
None
See application file for complete search history.

(56) References Cited

U.S. PATENT DOCUMENTS 6,064,424 A 5/2000 Van Berkel
6,069,650 A 5/2000 Battersby
(Continued)

FOREIGN PATENT DOCUMENTS

WO 2007072289 A2 6/2007
WO 2007072330 A1 6/2007
(Continued)

OTHER PUBLICATIONS

De Boer et al Switchable Lenticular Based 2D/3D Based Displays; Proceedings of SPIE 2007.
(Continued)

*Primary Examiner* — Matthew Yeung

(57) ABSTRACT

A multi-view display comprises a display panel comprising a regular array of pixels, each pixel comprising a rectangular array of sub-pixels of at least three colors, with a sub-pixel pitch in the row direction of r and a sub-pixel pitch in the column direction of c. A view forming arrangement is formed over the display panel and provides a view forming function in two directions. The view forming elements are arranged in grid of unit cells with a vector translation between adjacent unit cells which is designed such that the distribution of primary colors is equal for each view.

21 Claims, 7 Drawing Sheets

(52) U.S. Cl.
CPC ..... *H04N 13/0415* (2013.01); *H04N 13/0445* (2013.01); *H04N 2013/0077* (2013.01)

(56) References Cited

U.S. PATENT DOCUMENTS

| | | |
|---|---|---|
| 6,972,744 B1 | 12/2005 | Allio |
| 2003/0016444 A1 | 1/2003 | Brown |
| 2003/0214497 A1 | 11/2003 | Morishima |
| 2004/0070565 A1* | 4/2004 | Nayar .................. G06K 9/4661 345/156 |
| 2005/0046799 A1 | 3/2005 | Pezzaniti |
| 2005/0099688 A1 | 5/2005 | Uehara et al. |
| 2006/0195293 A1 | 8/2006 | Koike |
| 2006/0245063 A1 | 11/2006 | Ra |
| 2009/0046142 A1 | 2/2009 | Cha |
| 2009/0237563 A1* | 9/2009 | Doser ...................... G09G 5/00 348/579 |
| 2012/0057229 A1 | 3/2012 | Kikuchi et al. |

FOREIGN PATENT DOCUMENTS

| | | |
|---|---|---|
| WO | 2008032248 A1 | 3/2008 |
| WO | 2009101558 A1 | 8/2009 |
| WO | 2010122690 A | 10/2010 |
| WO | 2012140397 | 10/2012 |

OTHER PUBLICATIONS

Willemsen et al, "Fractional Viewing Systems to Reduce Banding in Lenticular Based 3D Diplays", Proc. of the International Display Workshops (2005) 12th vol. 2 p. 1789-1792.

\* cited by examiner

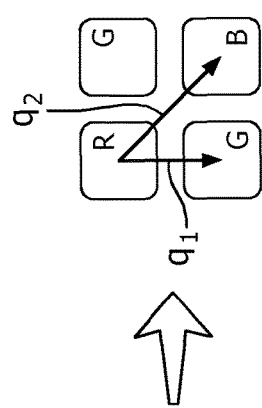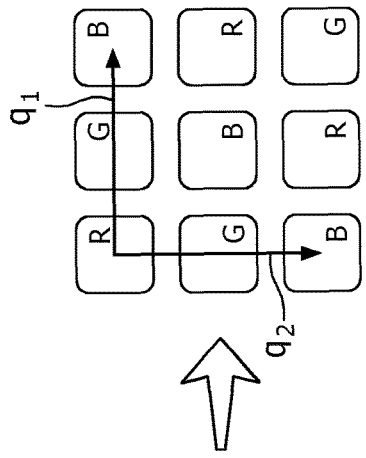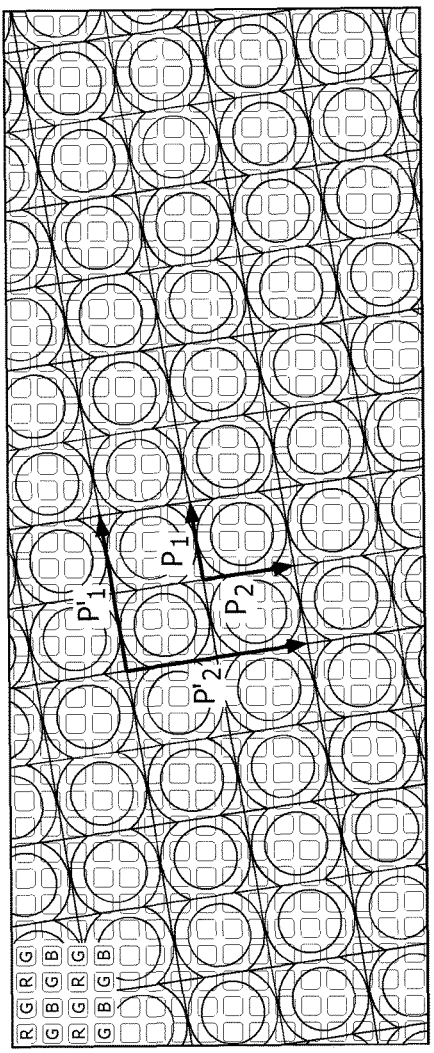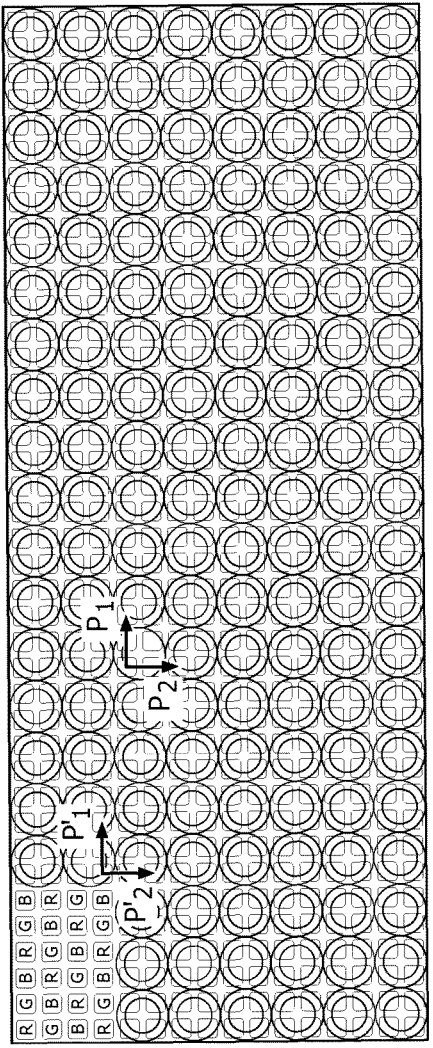
FIG. 4   FIG. 5

MULTI-VIEW DISPLAY DEVICE

CROSS-REFERENCE TO PRIOR APPLICATIONS

This application is the U.S. National Phase application under 35 U.S.C. § 371 of International Application No. PCT/EP2014/067952, filed on Aug. 25, 2014, which claims the benefit of EP Patent Application No. EP 13182714.9, filed on Sep. 3, 2013. These applications are hereby incorporated by reference herein.

FIELD OF THE INVENTION

This invention relates to multi-view displays.

BACKGROUND OF THE INVENTION

A multi-view display is typically created by applying a special layer to a 2D display. A known option for this layer is a barrier for barrier displays. Another option is an array with multiple lenses (instead of a barrier). The lens interfaces may be circular in a cross section parallel to the array or have another form e.g. an "elongated circle" when a directional focus adjustment is made. In the field of 3D displays such lenses are generally denoted "micro lenses". Yet another used option is a lenticular sheet with a multiple of elongated cylindrical lenses which is for instance indicated by reference numeral 20 in FIG. 9 of the present application. In the field of 3D displays such an elongated cylindrical lens is generally denoted "a lenticular lens". No matter which option is chosen, the effect is that depending on the viewpoint of an eye (or camera) a different image is projected, thus providing stereoscopic vision (stereopsis) without needing special glasses. This is what is meant by "auto" stereoscopic.

FIG. 1 shows the basic principle for a display using a lenticular lens sheet.

The display comprises a conventional (2D) display panel 2 having an array of pixels 4 over which a view forming arrangement 6 is provided. This comprises lenticular lenses 8. If each lens overlies 4 pixels in the display width direction, then light from those four pixels will be projected in different directions, thereby defining different viewing areas, numbered V1 to V4 in FIG. 1. In each of these viewing areas, an image is projected which is formed as the combination of all pixels with the same relative position with respect to the lenses.

The same effect can be achieved with barriers, which limit the output direction with which light is emitted from each pixel. Thus, in each output direction, a different set of pixels can be viewed.

The increase in angular resolution (i.e. the multiple views) results in a diminishing of the spatial resolution (i.e. the resolution of each individual view). In the case of vertical lenticular sheets and barriers, this resolution reduction is entirely in the horizontal direction. By slanting the lenticular sheet the resolution reduction can be spread over both horizontal and vertical directions providing for a better picture quality.

FIGS. 2 and 3 show examples of 3D lenticular display constructions.

FIG. 2 shows the least complicated design, comprising a lenticular lens sheet 6 over the display panel, with a spacer 10 in between. The curved faces of the lenticular lenses face outwardly, so that convex lenses are defined.

FIG. 3 shows a preferred design which has better performance under wide viewing angles, that is to say a reduction in angular dependent cross-talk, a reduction in banding, and low reflectivity. Another advantage is that the outer surface of the device is flat and robust. There is no need for an additional protective plate in front of the display as one of the lens arrangement substrates can provide this function.

The curved lens surfaces face the display panel, and a replica layer 12 is used to define a planar internal surface. This replica can be a glue (typically a polymer) that has a refractive index that is different from that of the lenticular lens, so that the lens function is defined by the refractive index difference between the lens material and the replica material. A glass or polycarbonate slab with a refractive index similar to the glue is used as the spacer 10, and the thickness is designed to provide a suitable distance for the lenticular lens to focus on the display panel.

It is well known that a 2D/multi-view switchable display can be desirable.

By making the lens of a multi-view display electrically switchable, it becomes possible for example to have a high 2D resolution mode (with no lens function) in combination with a 3D mode. Other uses of switchable lenses are to increase the number of views time-sequentially as disclosed in WO 2007/072330 or to allow multiple 3D modes as disclosed in WO 2007/072289.

The known method to produce a 2D/3D switchable display is to replace the lenticular lens by a lens-shaped cavity filled with liquid crystal material. The lens function can be turned on/off either by electrodes that control the orientation of LC molecules or else by changing the polarization of the light (for example using a switchable retarder).

The use of graded refractive index lenses has also been proposed, in which a box-shaped cavity is filled with liquid crystal and an electrode array controls the orientation of LC molecules to create a gradient-index lens. (This is disclosed for example in WO 2007/072330.) An electrowetting lens, which is formed of droplets of which the shape is controlled by an electric field, has also been proposed for 2D/3D switching. Finally, the use of electrophoretic lenses has also been proposed, for example in WO 2008/032248.

As mentioned above, there is always a trade-off between spatial and angular resolution. Displays with lenticular lenses and vertical barriers offer horizontal parallax only, allowing for stereopsis and horizontal motion parallax and occlusion, but not vertical motion parallax and occlusion. As a result, the autostereoscopic function is matched to the orientation of the display. Only with full (horizontal and vertical) parallax can the 3D effect be made independent of the screen orientation.

Display panels do not have sufficient resolution to enable full parallax at HD resolution, at least not with large numbers of views. There is therefore a problem for devices that are designed to operate in portrait and landscape mode, such as hand held devices.

This problem has been recognized, and some of the solutions above which provide 2D/3D switching capability have been extended to include multiple 3D modes, such as portrait and landscape modes. In this way, three modes are enabled: 2D, 3D portrait and 3D landscape.

WO 2007/072330 referenced above proposes a display panel and two switchable lenses. WO 2007/072289 also referenced above proposes two layers of GRIN electrodes.

These solutions result in complicated systems. For example, WO 2007/072289 creates a stack with two 2D/3D switchable lenses, while currently the cost of one such switchable lens may already be more than the price difference between a FHD and QFHD display panel. LC GRIN lenses are difficult to implement so crosstalk and cost will be typical issues.

Full parallax may be possible already for a system comprising just two views, thus resulting in only moderate resolution loss and therefore the switching between 3D modes can be avoided. If a non-switching approach is to be used, the minimal microlens array design that is dual view and dual orientation has 2×2 views and preserves the maximum amount of spatial resolution.

The common RGB stripe pixel layout comprises red, green and blue sub-pixel columns. Each sub-pixel has an aspect ratio of 1:3 so that each pixel triplet has a 1:1 aspect ratio. The lens system typical translates such rectangular 2D sub-pixels into rectangular 3D pixels.

When a microlens is associated with such a display panel, for example with each microlens over a 2×2 sub-array of pixels, the lens design has the problem that the viewing cone in one of the two orthogonal directions is three times as wide as in the other.

As with lenticular lens designs, it is important that the following problems are all prevented or at least reduced:

Loss of spatial resolution: the microlenses should be kept small.

Banding: these are visible black bands, especially visible when a user moves in respect to the display caused by the black mask area between sub-pixels. If necessary, this can also be solved via optical means such as a deliberate focus mismatch (e.g. an under focus) or a diffusing layer.

Crosstalk: this is caused by pixels being assigned to multiple views.

Color uniformity: all views should appear to have the same white point.

Spatial uniformity: views should have a similar spatial quality across the entire display.

Viewing cone: this should be similar in portrait and landscape direction.

Otherwise, in one direction (e.g. portrait) the user has to hold the device carefully to avoid getting out of the cone, while for the other direction (e.g. landscape) it may be difficult to find the 3D zone because the views are so wide.

Generally, different designs provide different compromises between these factors. The invention provides various designs which provide improved performance. In particular, some examples aim to ensure that each of the multiple views in the portrait orientation has the same distribution of primary colours and each of the multiple views in the landscape orientation has the same distribution of primary colours. Other examples aim to ensure that the viewing cone is similar in the portrait and landscape modes.

SUMMARY OF THE INVENTION

The invention is defined by the claims.

According to the invention, there is provided a multi-view display, comprising:

a display panel comprising a regular array of pixels, each pixel comprising a rectangular array of sub-pixels of at least three colours, with a sub-pixel pitch in the row direction of r and a sub-pixel pitch in the column direction of c; and a view forming arrangement formed over the display panel for providing a multi-view function whereby at least two laterally spaced views are provided, wherein the view forming arrangement provides a view forming function in two directions (e.g. row (horizontal) and column (vertical)), and comprises a repeating pattern of (for instance rectangular) view forming unit cells, wherein the view forming unit cells are arranged in grid with a vector translation between adjacent unit cells of $p_i$ having a unit cell row direction vector component expressed in units of r, a unit cell column direction vector component expressed in units of c, and wherein i=1 for one unit cell grid direction and i=2 for the other unit cell grid direction, wherein the vector translation is expressed as $p_i=(a_i, b_i)/c_i$ where $a_i, b_i \in \mathbb{Z}$ and $c_i \in \mathbb{Z}^+$, wherein $\mathbb{Z}$ means any integer number (including zero), $\mathbb{Z}^+$ means any positive integer number, and wherein integer combinations of vectors $p'_1=(a_1, b_1)$ and $p'_2=(a_2, b2)$ translate between sub-pixels of all colours, with a colour distribution that is equal to the colour distribution of the sub-pixels in each pixel, and wherein the view forming unit cell has an aspect ratio of between 2:5 and 5:2, wherein the aspect ratio is defined by $|p_1 \cdot (c,r)/p_2 \cdot (c,r)|$ where "·" is for vector inner product, and wherein |x| means the absolute value of x.

The area described by $p_1$ and $p_2$ defines a view forming unit cell, e.g. a single microlens, a single barrier opening or the crossing of two lenticular lenses. In FIGS. 4, 5, 6, 7, and 8, unit cells are indicated by two concentric circles that are cut off at the aperture of each view forming unit cell.

The view forming phase is the spatial position of a sub-pixel in relation to the view forming unit cell (e.g. lens) on top of it. A view forming phase is commonly called a view.

The vectors $p'_i=(a_i, b_i)$ can be thought of as pitch vectors which have been scaled to sizes which are integer numbers of sub-pixels. These vectors represent how the view forming unit cells repeat with respect to the relative position of the sub-pixel grid. For example, if each view forming unit cell is 2.5 sub-pixels wide (e.g. $c_1=c_2=2$) then the view forming unit cells repeat their alignment over the sub pixel grid every 5 sub-pixels. The area described by $p'_1$ and $p'_2$ defines a unit cell that encloses all view forming phases. This all-phase unit cell will be a $c_1 \times c_2$ array of view forming unit cells.

This does not account still for the colours of the sub-pixel. If a 3D unit cell is defined as a basic cell where all primary colors are represented with the same phase, this 3D unit cell will be (again) an array of all-phase unit cells.

An effect of the invention is that the distribution of (primary) colours is equal for each view. This is ensured because the view forming unit cells repeat in such a way that the (primary) colours of the display sub-pixels occupy all possible relative positions beneath the view forming unit cell.

With equal distribution of (primary) colours, it is meant that for each possible starting position, when traversing along $p'_1$ and $p'_2$, the distribution of colours is equal to the distribution of colours over the sub-pixels in a pixel (e.g. 25% red, 50% green, 25% blue for 2×2 RGBG layout and 33.3% red, green and blue for 3×1 RGB layout). This ensures that all views have the same white point and gamut.

Furthermore, by limiting the aspect ratio of the view forming unit cell, the viewing cones are made similar in the two view forming viewing directions.

A first set of examples has the lens grid slanted with respect to the sub-pixel array.

This approach can be applied to a 2×2 pixel sub-array. For example $p_1=(3,-1/2)$ and $p_2=(1/2,7/2)$. This provides near-square viewing elements (e.g. $|p_1| \approx |p_2|$ in metric units) giving good viewing cone matching.

The pixel sub-array can comprise a 4×2 sub-array such as two rows of red, green, blue and white sub-pixels with different ordering for each row. In this case one example is $p_1=(-5,3)$ and $p_2=(5,3)$. Again, the viewing elements are near-square.

In a second set of example, the unit cell grid is aligned with respect to the sub-pixel array.

This can be applied to a 3×3 pixel sub-array with $p_1=(2,0)$ and $p_2=(0,2)$.

The pixel sub-array can comprise a 4×2 sub-array, again with two rows of red, green, blue and white sub-pixels. Two examples are $p_1=(11/2,0)$ and $p_2=(0,7/3)$ or $(0,7/2)$.

The pixel sub-array can comprises a 3×1 RGB sub-array. Two examples are then $p_1=(14/3,0)$ and $p_2=(0,2)$ or $(0,4)$.

The view forming arrangement can comprise an array of microlenses. Alternatively a pair of crossed lenticular lenses can be used. For example, the view forming arrangement can comprise a first lenticular lens array spaced by a first distance from the display panel for providing multiple views across a first direction, and a second lenticular lens array spaced by a second distance from the first view forming structure for providing multiple views across a second perpendicular direction. (See FIGS. 9 and 10.) With this arrangement of crossed lenticular lenses the angular width of the multiple views in the first direction is independently defined with respect to the angular width of the multiple views in the second direction.

The invention can advantageously be applied in any multiview display device such as for example a 3D display device.

The invention can be especially advantageously used in a multiview (e.g. 3D) hand held device since in hand held devices there is a frequent desire to rotate the display (for instance while watching a series of photos, or movies) while still remaining good image performance especially with regard to resolution and viewing cone angle.

BRIEF DESCRIPTION OF THE DRAWINGS

Examples of the invention will now be described in detail with reference to the accompanying drawings, in which:

FIG. 4 shows a first example of display design of the invention;

FIG. 5 shows a second example of display design of the invention;

DETAILED DESCRIPTION OF THE EMBODIMENTS

Figure 1:
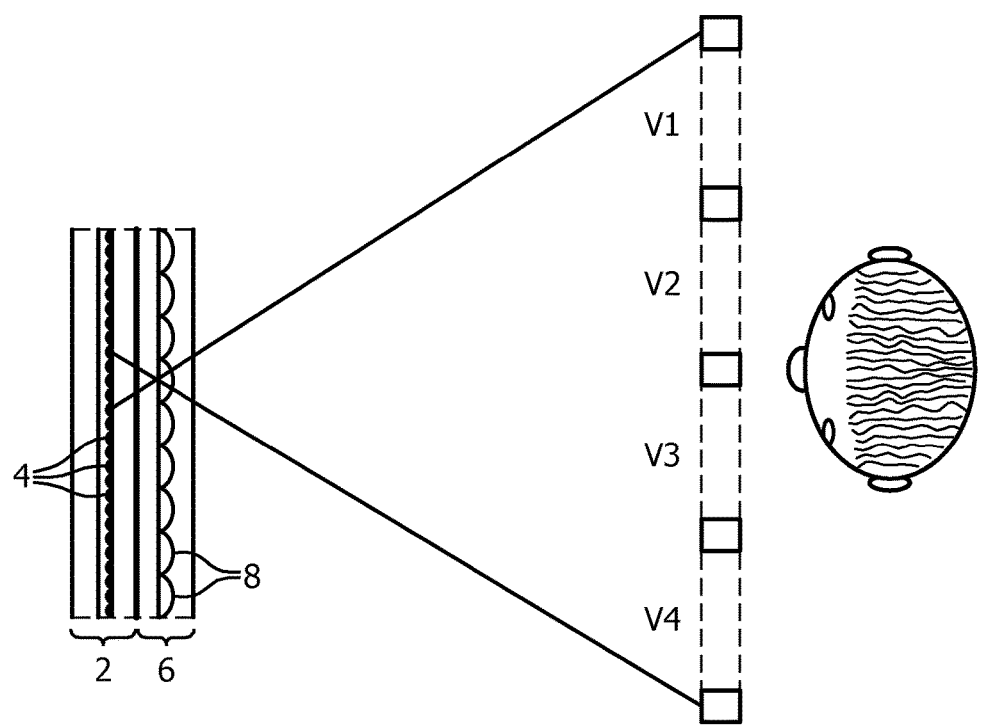
FIG. 1 shows a known multi-view display to explain the basic principle of operation.

The invention provides a multi-view display, comprising a display panel comprising a regular array of pixels, each pixel comprising a rectangular array of sub-pixels of at least three colours. A view forming arrangement is formed over the display panel and provides a view forming function in two directions. The view forming elements are arranged in grid of unit cells with a vector translation between adjacent unit cells which is designed such that the distribution of primary colours is equal for each view.

The invention provides an autostereoscopic display which has the same basic configuration as the known devices, but has the view forming arrangement and native display pixel grid designed with particular relationships. The basic configuration is the display panel module (OLED, LCD, reflective display, MEMS based interference modulation display for example) with pixels organized on a rectangular grid (e.g. rows and columns). Each pixel comprises an array of sub-pixels, and these are also formed as a rectangular grid.

A view forming arrangement is formed over the display (with a spacer if required). This can comprise a microlens array, although as will be discussed below, the same function can be achieved with a pair of crossed lenticular lenses.

The view forming arrangement can be defined as a grid of unit cells. In the case of a microlens array, a unit cell is one microlens. In the case of crossing lenticular lenses, a unit cell is the crossover area.

The unit cells are formed placed on a grid which repeats based on two pitch vectors $p_1$ and $p_2$, which may or may not be orthogonal. This gives parallelogram-shaped unit cell areas, such as rectangular, diamond-shaped, or square-shaped unit cell areas (for example upright or 45° tilted). Typically, the display is viewed in one of two orthogonal orientations, but this does not require the view forming unit cells to define an orthogonal grid. In other words, the relative slant between the view forming cell grid and the display pixel array can be different in the portrait and landscape modes.

These pitch vectors $p_1$ and $p_2$ are expressed using the coordinate system of the sub-pixel array. The two vector translations between the adjacent unit cells are $p_1$ and $p_2$ each having a row direction vector component expressed in units of sub-pixel row pitch (r), and a unit cell column direction vector component expressed in units of sub-pixel column pitch (c).

Thus, the vector $p_1$ is essentially a vector based on a count of the number of sub-pixels in the sub-pixel row and column direction to translate from one unit cell to the next in one of the unit cell grid directions.

The vector $p_2$ is essentially a vector based on a count of the number of sub-pixels in the sub-pixel row and column direction to translate from one unit cell to the next in the other of the unit cell grid directions.

This vector translation is expressed as $p_i=(a_i, b_i)/c_i$ where $a_i, b_i \in \mathbb{Z}$ and $c_i \in \mathbb{Z}^+$. This is the simplest expression of the vectors $p_1$ and $p_2$ using integers. This means that the vector $p'_1=(a_1, b_1)$ is essentially a vector based on a count of the number of sub-pixels in the sub-pixel row and column direction to translate from one unit cell to the next unit cell which has the same position relative to the sub-pixel grid, in one of the unit cell grid directions.

Vector $p'_2=(a_2, b_2)$ is essentially a vector based on a count of the number of sub-pixels in the sub-pixel row and column direction to translate from one unit cell to the next unit cell which has the same position relative to the sub-pixel grid, in the other of the unit cell grid directions.

The vectors $p'_1$ and $p'_2$ are the smallest multiple of $p_1$ and $p_2$ respectively with integral components of vector coordinates.

The invention ensures that the vectors $(a_1, b_1)$ and $(a_2, b_2)$ translate between sub-pixels of all colours. Thus, with repetitions of the unit cell grid over the sub-pixel array, the positions occupied by different colour sub-pixels relative to the unit cells changes. Thus, the pitch vectors are chosen such that distribution of primaries is equal for each view. This requirement implicitly means that the distribution of primaries in each view is equal to the distribution of primaries within each sub-pixel in the underlying panel.

Not all choices of pitch vector result in a display with a uniform brightness and color. A view can be defined as the set of elements with a certain position in respect to the closest lens center. If a view occurs only for some lenses, then this is a fractional view, otherwise it is a full view.

The distribution of primaries (e.g. "equal amounts of red, green, blue" or "25% red, 50% green, 25% blue") should be equal for each view.

The invention is based on designs which achieve this and examples are given below of possible pixel layouts and respective choices for microlens layouts.

Note that the invention applies to unit cell grids which are slanted with respect to the sub-pixel array as well as unit cell grids which are aligned with respect to the sub-pixel array.

FIG. 4 shows a first example of arrangement of the invention, and will be used to explain the relationships outlined above. FIG. 4 shows the display and the relative positions of a grid of microlenses. The sub-pixels are shown. The inlay shows the structure of one pixel. R is red, G is green and B is blue. This is a 2×2 RGGB pixel grid.

Given a pixel layout, one of the components is selected as the origin.

The sub-pixel grid is defined using a coordinate system with a first direction (left to right) and a second direction (top to bottom).

The microlens grid is defined by two pitch vectors $p_1$ and $p_2$, expressed in the coordinate system of the sub-pixel grid. These vectors $p_1$ and $p_2$ translate between adjacent unit cells. In this example $p_1=(3, -1/2)$, $p_2=(1/2, 7/2)$.

For arbitrary real-valued pitch vectors, the relation between elements and lenses is pseudo-random and gives a non-uniform image. The solution is to limit the pitch vector elements to rational numbers with a small denominator. This ensures that there is a smallest repeating unit cell comprising all color components for 3D view.

The components of a pitch vector are rational numbers, and they can thus be expressed as $p_i=(a_i, b_i)/c_i$ where $a_i, b_i \in \mathbb{Z}$ and $c_i \in \mathbb{Z}^+$. The numerator is defined as vector $p'_i$, and these are the vectors shown in FIG. 4.

If $c_i$ is 2 or more, this is the "fractional" design mentioned above, which means the adjacent microlenses do not have the same positioning relative to the sub-pixel grid. If $c_i=1$ than the pitch is integral and this is the "full" design mentioned above. A design can be fractional in one direction and full in the other direction.

As an example a display with fractional view and slanted grid can be made wherein $c_i \geq 2$, $a_i \neq 0$, $b_i \neq 0$ and where a step by $p'_1$ or $p'_2$ (and thus also $q_1$ or $q_2$) translates to sub-pixels of different primaries.

Another example is a display with fractional view and slanted grid where the unit cell is as small as possible given a desired number of views $N_1$ and $N_2$, with $|N_i| \geq 3$, in column and row direction respectively, namely: $c_i=2$, 2×2 sub-pixels per pixel, where $p_1=(N_1, s)/2$ and $p'_2=(-s, N_2)/2$, for $s=\pm 1$. By way of example $N=N_1=N_2$ and there is a 1:1 AR of sub-pixels. $N_1$ is the number of full views in one direction (e.g. column direction) and $N_2$ is the number of full views in the other direction (e.g. column direction).

Yet another example is a display with fractional view and slanted grid (which generates more fractional views) wherein $c_i=3$, 2×2 sub-pixels per pixel (preferably 1:1 AR sub-pixels), where $p_1=(N_1, s)/3$ and $p'_2=(-s, N_2)/3$, for $s=\pm 1$.

Still another example is a display with fractional view and slanted grid wherein $c_i \geq 2$, 2×2 sub-pixels per pixel and where $p_1=(2k_1+1, 2k_2+1)/c_1$ and $p_2=(-2k_1-1, 2k_2+1)/c_2$, wherein $k_1$ and $k_2$ are integers $\in \mathbb{Z}$.

For the example of FIG. 4, $p_1=(6, -1)/2$ and $p_2=(1, 7)/2$. Thus the design is fractional in both directions.

The numerators $p'_1$ and $p'_2$ point to the smallest multiple of p that aligns to the pixel grid. For FIG. 4, $p'_1=(6, -1)$ and $p'2=(1, 7)$. These are shown in FIG. 4.

Note that when $c=1$, $p=p'$.

The inlay shows that by moving by $p'_1$ or $p'_2$ the effect is to move in direction $q_1$ or $q_2$ respectively within the color components of the sub-pixel array. For example vector $p'_1$ translates from a red sub-pixel to a green sub-pixel as shown. Vector $p'_2$ translates from a red sub-pixel to a blue sub-pixel as shown.

This means that combinations of $q_1$ and $q_2$ reach all primaries in the array of sub-pixels. This means that each view has all primaries. In particular, if an integral combination of $q_1$ vectors and $q_2$ vectors allows all primaries to be reached, then there is the desired distribution of primaries among all views.

The example of FIG. 4 is a fractional design with slanted microlenses, based on a 2×2 RGGB pixel grid (i.e. the so-called Bayer pattern). In this design, banding will be largely prevented by virtue of the fractional arrangement in both unit cell directions.

The same conceptual approach applies to all examples, so the detailed discussion will not be repeated.

FIG. 5 shows a minimal microlens design for two views in the two orthogonal directions, based on a 3×3 RGB pixel grid, and with integral pitch vectors $p_1=(2, 0)$, $p_2=(0, 2)$, wherein the primaries are distributed to form a Latin square, meaning that each primary occurs only once for each row and each column in the unit cell. In this case $p_1=p'_1$ and $p_2=p'_2$ because $c_1=1$ and $c_2=1$. With four primaries, a 4×4 Latin square layout could be used with $p_1=(3, 0)$, $p_2=(0, 3)$. More generally, with n primaries, an n×n Latin square layout should be combined with $p_1=(k, 0)$, $p_2=(0, k)$ wherein n and $k \geq 2$ are coprime (greatest common divider of n and k is 1). The primaries in the 3D views will also be distributed to form a Latin square, thus providing a small (nk×nk) 3D unit cell with a good distribution of primaries.

Note that with a 2×2 sub-pixel array and microlenses over 2×2 sub-pixels, the views would be of one colour. By making the pitch of the sub-pixel array larger and odd-valued as in FIG. 5 or the pitch of the microlens array larger as in FIG. 4 the required colour distribution is obtained.

As mentioned above, for the example of FIG. 4, $p_1=(6, -1)/2$ and $p_2=(1, 7)/2$. An un-slanted version of FIG. 4 (with the same 2×2 RGGB sub-pixel grid) is also possible with $p_1=(3, 0)$ and $p_2=(0, 3)$. For FIG. 5, with the 3×3 RGB subpixel grid, $p_1=(2, 0)$ and $p_2=(0, 2)$.

By moving by $p_1$ or $p_2$, there are jumps in directions $q_1$ or $q_2$ respectively within the color components of the array of sub-pixels. Combinations of $q_1$ and $q_2$ reach all primaries in the unit cell (but not all elements), so each view has all primaries. Without extra measures, banding will be visible in either direction, as is typical for dual view designs.

The example of FIG. 5 has square elements. The pixel grid is a 3×3 RGB grid. The same pixel grid and same lens design can be used but both 45° rotated. Two views have horizontal parallax only and two views have vertical parallax only. This may improve viewing comfort for narrow-viewing cone displays. Another advantage is easier image processing because all image processing operations are in row or column direction.

FIG. 5 also shows that reaching all primaries is not necessarily the same as reaching all pixel components.

Figure 6:
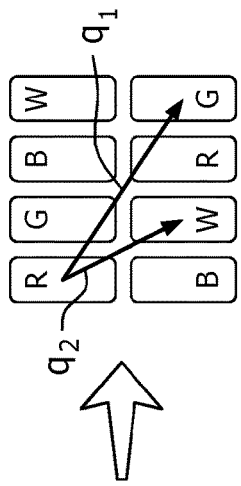
FIG. 6 shows a third example of display design of the invention.
Figure 6:
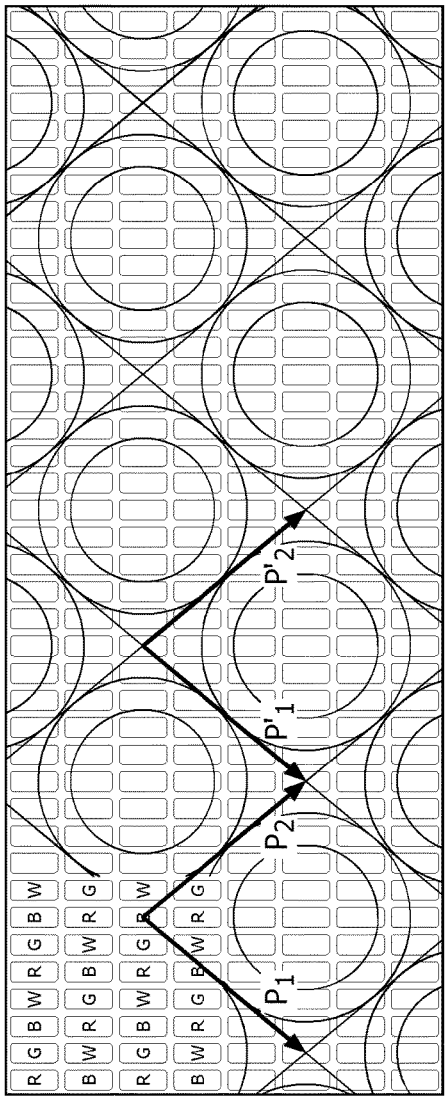

FIG. 6 shows an example based on diamond-shaped microlenses with a 4×2 RGBW pixel grid (so-called "PenTile" pixel layout). The sub-pixels have a 1:2 aspect ratio. This design has integral pitch vectors $p_1=(-5, 3)$, $p_2=(5, 3)$. The design has more views in the horizontal than in the vertical direction to compensate for the aspect ratio of the sub-pixels. The lens aspect ratio is closer to 1:1 than that of the sub-pixels, such that the viewing cone is (approximately) similar in all directions.

The inlay shows that with multiple steps all primaries can be reached, so each view has all primaries. A so-called "PenTile RGBG" grid can also be used instead of the RGBW grid shown.

Figure 7:
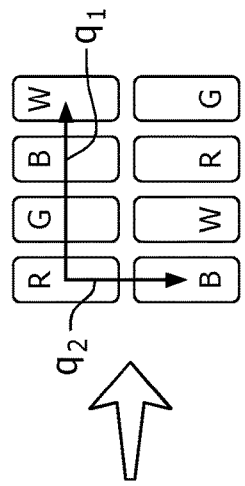
FIG. 7 shows a fourth example of display design of the invention.
Figure 7:
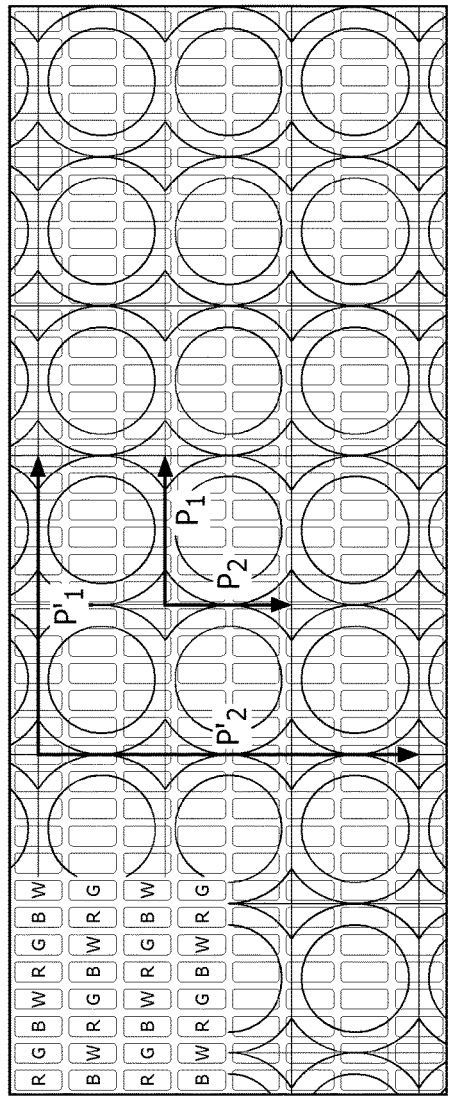

FIG. 7 shows an example of a fractional design but with non-slanted microlenses, with the PenTile RGBW pixel grid (again with sub-pixels with aspect ratio 1:2) and fractional pitch vectors $p_1=(11/2, 0)$, $p_2=(0, 7/3)$. (Note that the rectangle defined by $p'_1$ and $p'_2$ comprises 6 view forming unit cells: 2 columns of 3 rows of view forming unit cells.)

The vectors $p'_1$ and $p'_2$ as shown again point to the shortest multiple that aligns to the pixel grid, i.e. $p'_1=(11, 0)$ and $p'_2=(0, 7)$.

The inlay shows that by moving by $p'_1$ or $p'_2$ there is translation between sub-pixels in direction $q_1$ or $q_2$ respectively within the sub-pixel array. Combinations of $q_1$ and $q_2$ can again reach all primaries in the unit cell, so each view has all primaries.

Banding will be largely prevented but $p_2$ is small so crosstalk will have an effect on views in the vertical direction. If $p_2$ is small but not integral, light from neighboring phases (i.e. views) will overlap causing crosstalk. This is acceptable for larger pitch values, but when $2<|p_2|<3$ then there are only 2 views in a cone without crosstalk between them. For this reason integral $p_i$ is preferred when $|p_i|<3$ and non-integral values are preferred for higher values.

When more views in vertical direction is required, then the design of FIG. 7 can be changed by setting $p_2=(0, 7/2)$, with all other parameters unchanged.

Figure 8:
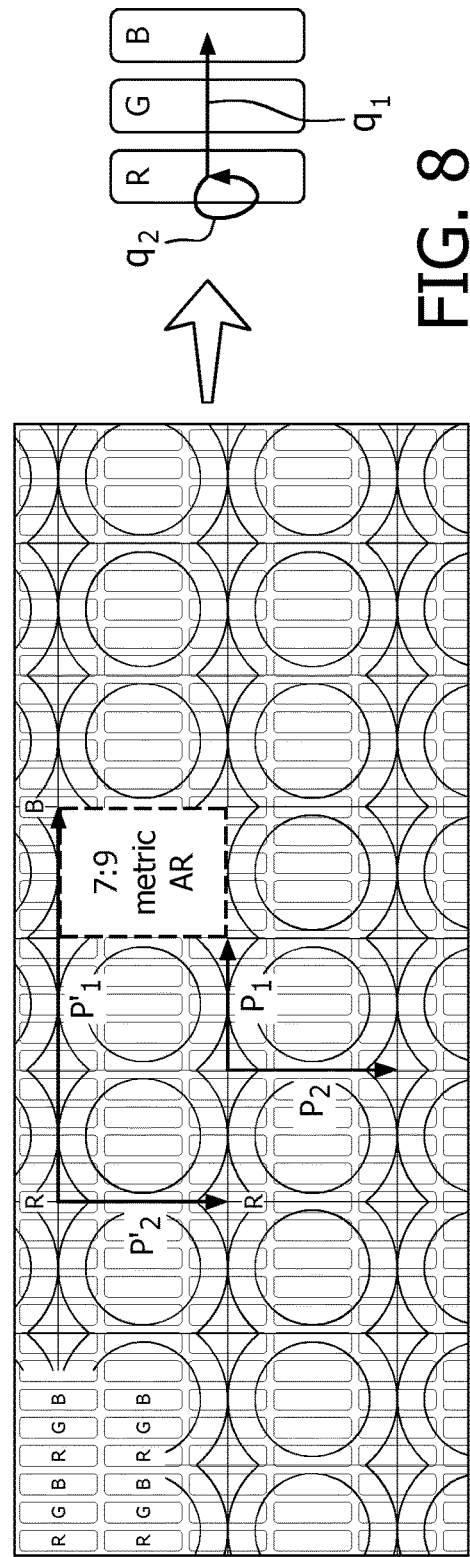
FIG. 8 shows a fifth example of display design of the invention.

FIG. 8 shows rectangular-shaped lenses that are upright, with an RGB pixel grid (with sub-pixel aspect ratio 1:3). This is a semi-fractional example with a non-slanted microlens design. The fractional pitch vector $p_1=(14/3, 0)$, and the integral pitch vector $p_2=(0, 2)$. The lens aspect ratio in metric space is 7:9 so the viewing cone angle in portrait and landscape direction is similar.

In landscape direction the device is multi-view (4+ effective views, 14 fractional views), while in portrait direction there are two full views.

Steps in the $q_1$ direction cycle through the primaries, so each view has all primaries.

Banding will occur in the non-fractional vertical direction (as is typical for dual view designs).

For the RGB stripes the minimal design is $p_1=(2,0)$ and $p_2=(0,2)$.

The examples above show that the invention can typically be applied to arrays of sub-pixels with aspect ratios in the range of 2:5 to 5:2 (e.g. 3:2, 4:3, 9:16 etc.) and combining these with view forming unit cells with aspect ratios which are in the range 1:2 to 2:1.

Figure 9:
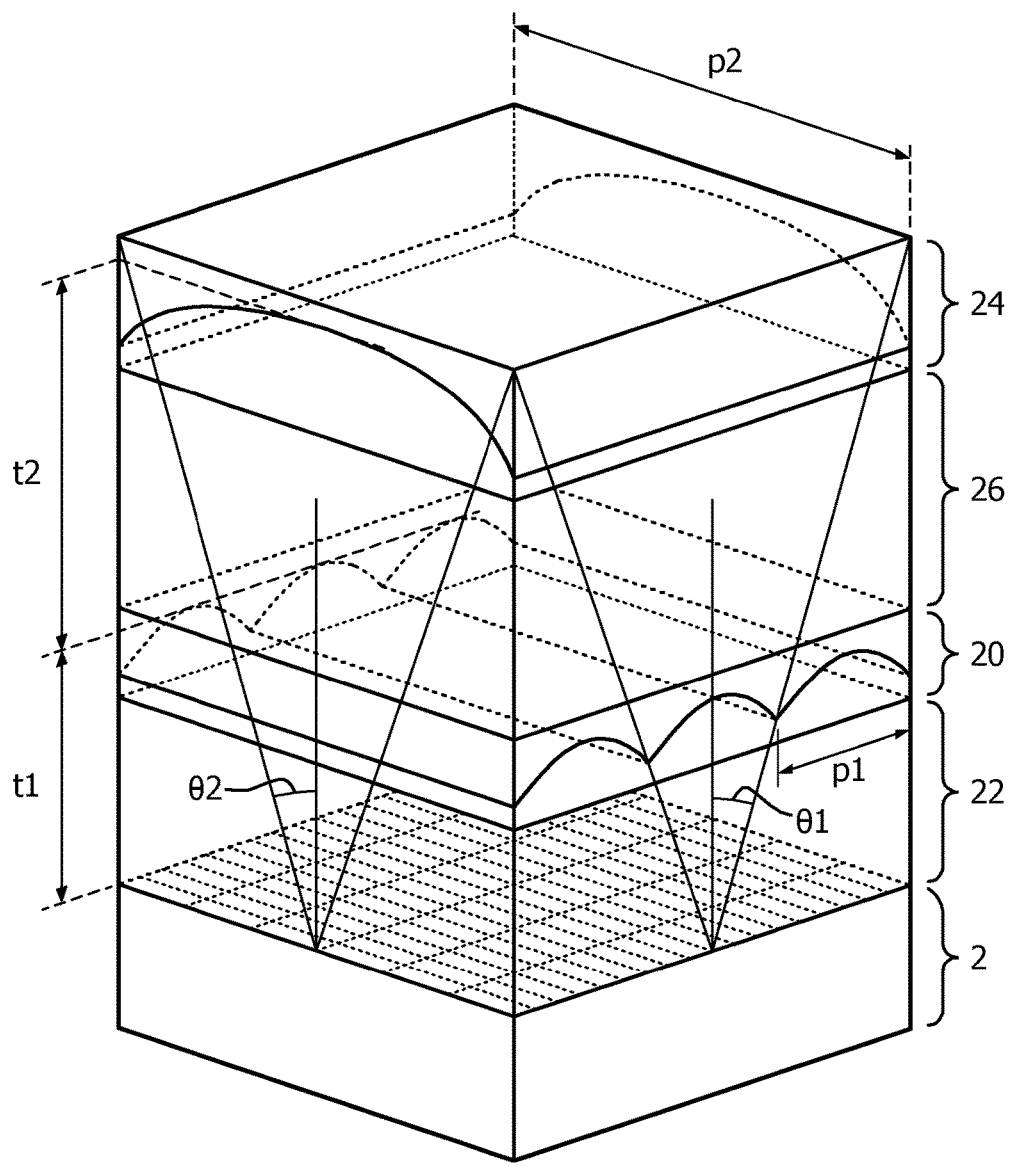
FIG. 9 shows a first example of view forming arrangement which can be used.

Optionally a construction can be used that corrects the viewing cone angles to make them more similar. FIG. 9 depicts such a view forming arrangement. This construction can be used even in the situation wherein the view forming unit cells aspect ratios are outside the range 1:2 to 2:1.

Preferably, the view forming unit cell has an aspect ratio of between 1:2 and 2:1, more preferably between 1:1.5 and 1.5:1, more preferably between 1:1.2 and 1.2:1, for example 1:1. The sub-pixel aspect ratio can be between 2:1 and 1:2, more preferably between 1.2:1 and 1:1.2, for example 1:1.

Thus, Bayer and PenTile RGBW pixel structures are for example preferred over RGB stripes because of the pixel aspect ratio.

The preferred lens pitch aspect ratios ensure that the viewing cone is similar (or equal) in both directions. In preferred embodiments, the aspect ratio of the lens is closer to 1:1 than the aspect ratio of the pixel, for the same reason.

As explained above, for embodiments with a pitch $\|p_i\|<3$, integral elements ($c_i=1$) are preferred. In embodiments with a pitch $\|p_i\|\geq 3$, fractional elements ($c_i>1$) are preferred. Thus, for magnitudes of one or both the vectors $p_1$ and $p_2$ less than 3, the corresponding value of $c_1$ and $c_2$ is equal to 1, and for the magnitudes of one or both of the vectors $p_1$ and $p_2$ equal to or more than 3, the corresponding value of $c_1$ and $c_2$ is 2 or more.

In some examples, such as FIG. 6, the pixel components within the smallest repeating unit cell are positioned such that the average color for each row or column is as green as possible. This maximum is typically achieved by placing components that have greens (white, yellow, cyan, green) on a diagonal. This is because the human visual system is most sensitive to greenish hues. This also gives better perception of horizontal or vertical lines in 3D.

As mentioned above, a 3D unit cell can be defined as a repeating unit for which each sub-pixel covers both colour and position relative to the view forming unit cell (e.g. microlens). The 3D unit cell is typically larger than the basic repeating cell defined by $p'_1$ and $p'_2$. This 3D unit cell has a dimension:

| | |
|---|---|
| $4p_1 \times 4p_2 = 2p'_1 \times 2p'_2$ | FIG. 4: |
| $3p_1 \times 3p_2 = 3p'_1 \times 3p'_2$ | FIG. 5: |
| $4p_1 \times 4p_2 = 4p'_1 \times 4p'_2$ | FIG. 6: |
| $8p_1 \times 6p_2 = 4p'_1 \times 2p'_2$ | FIG. 7: |
| $9p_1 \times p_2 = 3p'_1 \times p'_2$ | FIGS. 8 and 9: |

The use of a microlens array is preferred. However, an alternative is based on the combination of two crossed lenticular lenses instead of microlenses. This design enables differences in viewing cone size to be avoided.

A regular microlens display does not allow independent design of the viewing cone in first and second directions. In fact, the viewing cone ratio equals the sub-pixel aspect ratio multiplied by the ratio of number of full views along the two directions:

$$\frac{a_1}{a_2} \frac{N_1}{N_2}$$

where $a_1$ and $a_2$ are the sub-pixel dimensions along the two directions (for instance row and column direction), and $N_1$ and $N_2$ are the number of full views in respective directions (e.g. the lens pitch expressed as a sub-pixel count).

A regular microlens is suitable when:

$$\frac{a_1}{a_2} \frac{N_1}{N_2}$$

is close to the desirable viewing cone ratio.

The applicant has proposed a display that performs like a microlens display, but does allow independent design of the viewing cones.

Figure 10:
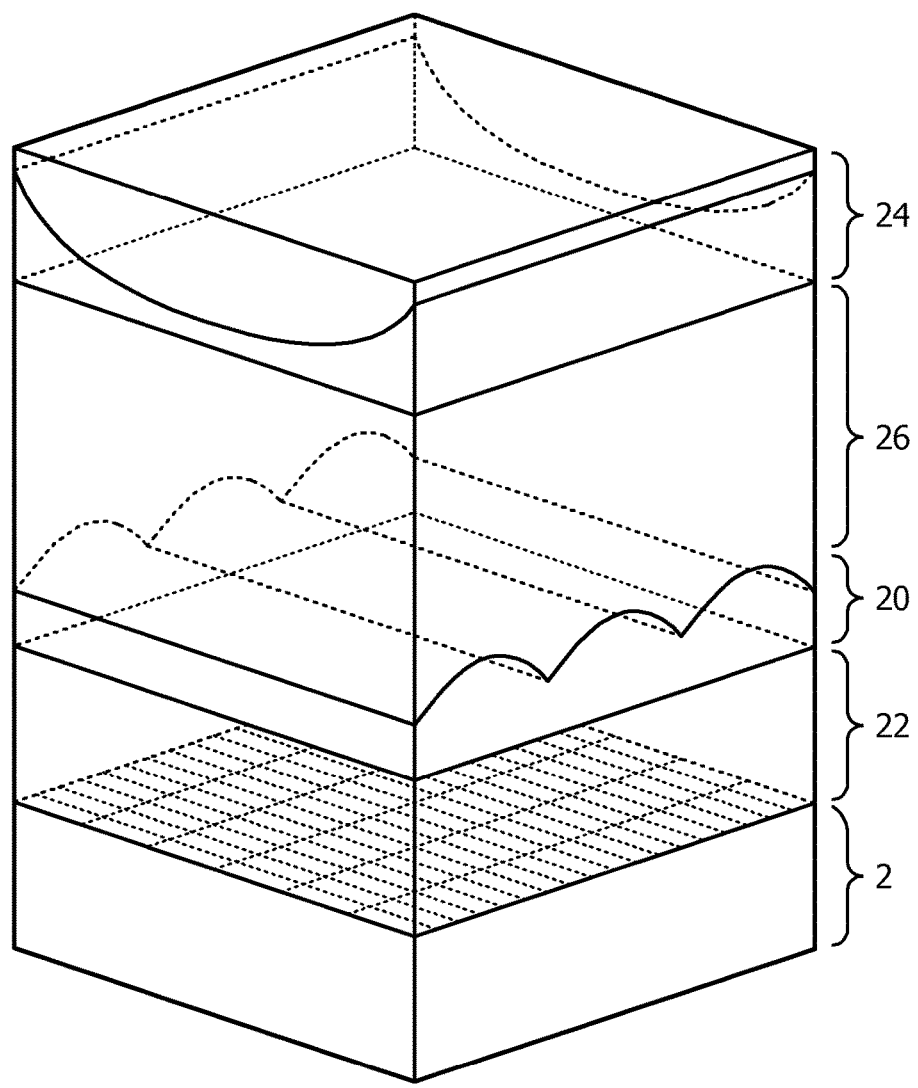
FIG. 10 shows a second example of view forming arrangement which can be used.

FIG. 10 shows a first example of view forming arrangement as proposed in the form of a lens stack.

The lens arrangement comprises a first lens arrangement 20 spaced from the surface of the display panel 2 by a bottom spacer 22. The first lens arrangement and spacer have a combined thickness of $t_1$ so that the lens surfaces are a distance $t_1$ from the display panel 2. A second lens arrangement 24 is spaced from the first lens arrangement 20 by a second spacer 26. The second lens arrangement and the second spacer have a combined thickness of $t_2$ so that the lens surfaces are a distance t2 from the first lens arrangement and at a distance of $t_1+t_2$ from the display panel 2. The two lens arrangements are designed with sufficient focus on the pixels in the display panel module.

For thin lenses, the thickness of the lens array can be ignored. The viewing cone half-angle $\theta_1$ in the material of the spacer in the first direction as implemented by the first lens array 22 is given by $\tan \theta_1 = p_1/2t_1$, as can be seen from FIG. 5.

As an approximation, if the viewing cone angle is small, the full viewing cone angle in the material $\alpha_1 = 2\theta_1$ can be approximated by $\tan \alpha_1 = p_1/t_1$.

For the example of the two spacers having the same refractive index, the viewing cone half-angle in the material of the spacer in second direction as implemented by the second lens arrangement is given by $\tan \theta_2 = p_2/2(t_1+t_2)$, or as an approximation for the full viewing cone $\tan \alpha_2 = p_2/(t_1+t_2)$.

If, for example, viewing cones should be designed to be similar, then:

$$\frac{p_1}{t_1} \approx \frac{p_2}{t_1 + t_2}$$

In the case the two spacers are made of materials with different refractive indices and in the approximation of thin lenses, the above condition of having similar viewing cones in two directions of observation in air can be written as $$\frac{p_1}{(t_1/n_1)} \approx \frac{p_2}{(t_1/n_1) + (t_2/n_2)}$$

where $n_1$ and $n_2$ are refractive indices of the material of the first and the second spacer respectively.

For example, in the case of an RGB striped display, where the pixel components have a height to width ratio of 3:1, for the design with the same number of views in two observation directions (for instance 2×2 view design) the pitches of the lens-stack relate as $3p_1 = p_2$, so $2t_1 \approx t_2$.

This means the spacer that is sandwiched by the lenses is optically thicker than the spacer between the display panel and the first lens 20.

The lens design can use non-switchable lenses, so that full parallax is provided permanently. The same viewing cone performance is obtained for either display orientation.

There is some freedom in implementing the invention.

Figure 2:
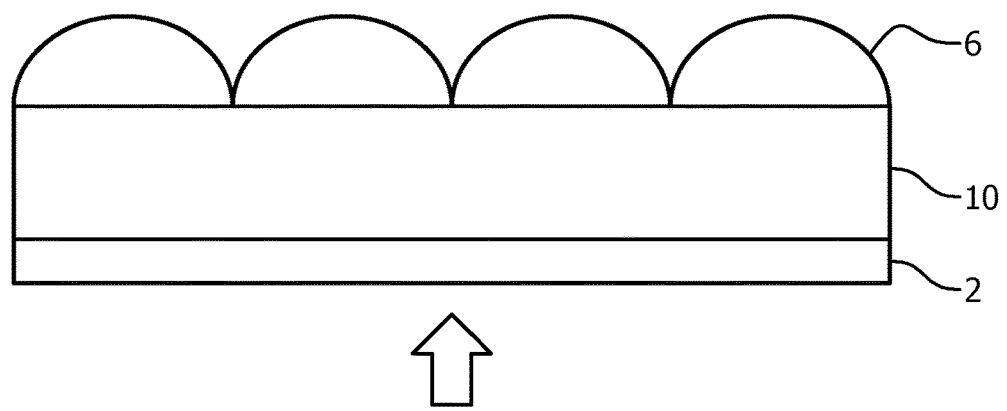
FIG. 2 shows a first example of known lens design.
Figure 3:
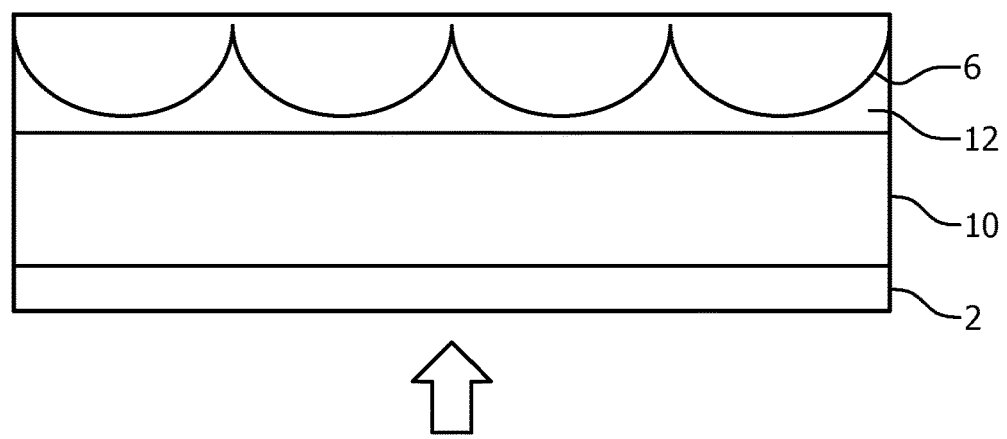
FIG. 3 shows a second example of known lens design.

The lens curvatures can be positive or negative, for example as explained with reference to FIGS. 2 and 3.

In some configurations, a spacer can be integrated with a lens by making the planar side of the lens thicker.

Either one or both of the lenses could be made as a switchable lens, for instance using one of the techniques that are described above. This could be used to enable the lens function to be switched off completely for a 2D mode, or it could be used to enable parallax in one direction only but with a higher resolution in another direction.

In a system with thick lenses and various refractive indexes, the above relations are only rough approximations. In practice, a balance will be found through numerical simulation and by choosing materials, lens shapes and spacer thicknesses in conjunction. These parameters are typically optimized such that the viewing cone is similar in both directions (e.g. portrait and landscape).

It may be desired to decrease the total thickness of the structure to reduce weight and size for a portable device. For this reason, in a preferred embodiment it will be advantageous to realize the lower spacer with a higher refractive index, whilst the top spacer should have a lower refractive index, for example air. In this manner, the total stack thickness is reduced whilst maintaining the optical ratio (e.g. 3:1) to maintain cone sizes. A further consequence of such an approach is that the lens interfaces will preferably have opposite curvatures.

Two example solutions will now be presented.

1. Air Gap Solution

This solution can have the structure as shown in FIG. 9. Spacer 22 is glass/plastic, for example with refractive index 1.5.

Lens 20 is glass/plastic and plano-convex as shown in FIG. 9.

Spacer 26 is an air gap with mechanical supports to provide the desired fixed distance.

Lens 24 is glass/plastic and also plano-convex (as shown in FIG. 9).

2. Low Refractive Index Difference Solution

This solution can have the structure shown in FIG. 10. In this context, a low refractive index is in the range 1.3-1.5 (typically 1.4), a high refractive index is in the range 1.45-1.75 (typically 1.6), and a low refractive index difference is in the range 0.1-0.3 (typically 0.2).

Spacer 22 is glass/plastic with high refractive index. Lens 20 is integrated with spacer 22 and is the same glass/plastic with the same high refractive index and is plano-convex.

The spacer 26 has a low refractive index. The lens/spacer unit 20,22 is laminated to the second spacer 26 with low index-matching glue.

The second lens 24 also has a high refractive index and is plano-convex, and is laminated to the spacer 26 with low index-matching glue. However, the second lens is inverted compared to the first lens, so that it defines a concave lens shape with respect to the direction of display light through the lens stack. The first lens 20 is thus arranged as shown in FIG. 2 and the second lens 24 is arranged as shown in FIG. 3.

There can be more than two refractive index values in the system, but each interface gives reflections that add to the 3D crosstalk. Unnecessary interfaces should thus be avoided.

The description above is based non-switchable lenses. However, the lens can be switchable to improve 2D performance.

Rendering could make use of a tilt-sensor to only render parallax in one direction. Alternatively, all views could be rendered, which allows for immediate response when a user rotates the display.

The invention can be applied to phones, tablets and cameras with autostereoscopic displays.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A multi-view display, comprising:
  a display panel comprising a regular array of pixels, each pixel comprising a rectangular array of n×m sub-pixels of at least three colors, with a sub-pixel pitch r in the row direction and a sub-pixel pitch c in the column direction; and
  a view forming arrangement formed over the display panel for providing a multi-view function whereby at least two laterally spaced views are provided,
  wherein the view forming arrangement provides a view forming function in two directions, and comprises a repeating pattern of view forming unit cells,
  wherein the view forming unit cells are arranged in grid with a vector translation between adjacent unit cells of $p_i$ having a unit cell row direction vector component expressed in units of r, and having a unit cell column direction vector component expressed in units of c,
  wherein i=1 for the unit cell row direction and i=2 for the unit cell column direction,
  wherein the vector translation is expressed as $p_i=(a_i, b_i)/c_i$ where $a_i, b_i \in \mathbb{Z}$ and $c_i \in \mathbb{Z}^+$,
  wherein $\mathbb{Z}$ means any integer number (including zero), $\mathbb{Z}^+$ means any positive integer number,
  wherein integer combinations of vectors $p'_1=(a_1, b_1)$ and $p'_2=(a_2, b_2)$ translate between sub-pixels of all colors, with a color distribution that is equal to the color distribution of the sub-pixels in a pixel,
  wherein the view forming unit cell has an aspect ratio of between 1:2 and 2:1, wherein the aspect ratio is defined by $|p_1(c,r)/p_2(c,r)|$.

2. The multi-view display as claimed in claim 1, wherein the view forming unit cell has an aspect ratio between 1:1.5 and 1.5:1.

3. The multi-view display as claimed in claim 1, wherein the sub-pixel aspect ratio is between 2:5 and 5:2.

4. The multi-view display as claimed in claim 1, wherein $c_i \geq 2$, $a_i \neq 0$, $b_i \neq 0$ and where a step by $p'_1$ or $p'_2$ translates to sub-pixels of different primaries.

5. The multi-view display as claimed in claim 1, wherein $c_i=2$, 2×2 sub-pixels per pixel and where $p_1=(N_1,s)/2$ and $p'_2=(-s, N_2)/2$, for s=±1, wherein $N_1$ is the number of full views in a first direction and $N_2$ is the number of full views in a second direction.

6. The multi-view display as claimed in claim 1, wherein $c_i=3$, 2×2 sub-pixels per pixel, where $p_1=(N_1,s)/3$ and $p'_2=(-s, N_2)/3$, for s=±1, wherein $N_1$ is the number of full views in a first direction and $N_2$ is the number of full views in a second direction.

7. The multi-view display as claimed in claim 1, wherein $c_i \geq 2$, 2×2 sub-pixels per pixel and where $p_1=(2k_1+1, 2k_2+1)/c_i$ and $p_2=(-2k_1-1, 2k_2+1)/c_2$, wherein $k_1$ and $k_2$ are integers $\in \mathbb{Z}$.

8. The multi-view display as claimed in claim 1, wherein the view forming unit cell grid is slanted with respect to the sub-pixel array.

9. The multi-view display as claimed in claim 8, wherein each pixel comprises a 2×2 array of sub-pixels wherein $p_1=(3,-1/2)$ and $p_2=(1/2,7/2)$.

10. The multi-view display as claimed in claim 8, wherein the pixel sub-array comprises two rows of red, green, blue and white sub-pixels and $p_1=(-5,3)$ and $p_2=(5,3)$.

11. The multi-view display as claimed in claim 1, wherein the view forming unit cell grid is aligned with respect to the sub-pixel array and the pixel sub-array comprises a 3×3 sub-array and $p_1=(2,0)$ and $p_2=(0,2)$.

12. The multi-view display as claimed in claim 1, wherein the view forming unit cell grid is aligned with respect to the sub-pixel array and the pixel sub-array comprises two rows of red, green, blue and white sub-pixels, and $p_1=(11/2, 0)$ and $p_2$ is selected from the group consisting of (0,7/3) or (0,7/2).

13. The multi-view display as claimed in claim 1, wherein the view forming unit cell grid is aligned with respect to the sub-pixel array and the pixel sub-array comprises a 3×1 RGB sub-array and p1=(14/3,0) and p2 is selected from the group consisting of (0,2) or (0,4).

14. The multi-view display as claimed in claim 1, wherein a magnitude of one or both the vectors $p_1$ and $p_2$ are less than 3 and the corresponding value of $c_1$ and $c_2$ is equal to 1.

15. The multi-view display as claimed in claim 1, wherein the view forming arrangement comprises an array of microlenses.

16. The multi-view display as claimed in claim 1, wherein the view forming arrangement comprises a first lenticular lens array spaced by a first distance from the display panel for providing multiple views across a first direction, and a second lenticular lens array spaced by a second distance from the first view forming structure.

17. The multi-view display as claimed in claim 1 wherein the view forming arrangement is electrically switchable between a view forming mode and a pass through mode.

18. A hand held device comprising the multi-view display as claimed claim 1.

19. The multi-view display as claimed in claim 1, wherein the view forming unit cell has an aspect ratio between 1:1.2 and 1.2:1.

20. The multi-view display as claimed in claim 1, wherein the sub-pixel aspect ratio is between 1.2:1 and 1:1.2.

21. The multi-view display as claimed in claim 1, wherein a magnitude of one or both of the vectors $p_1$ and $p_2$ are equal to or more than 3, and a corresponding value of $c_1$ and $c_2$ is 2 or more.

* * * * *